Jan. 17, 1956 R. D. SEIZERT 2,731,048
BOW TYPE CHAIN SAW CONSTRUCTION
Filed July 17, 1953 2 Sheets-Sheet 1

INVENTOR.
Robert Seizert
BY
Thos. L. Donnelly
ATTORNEY.

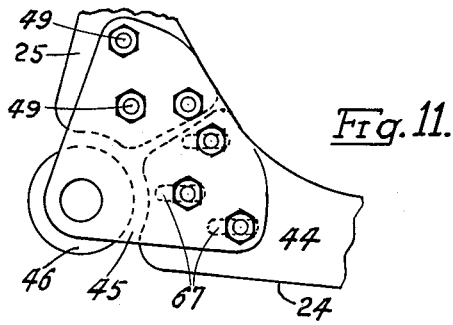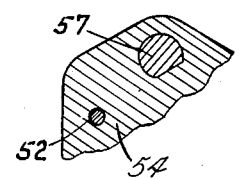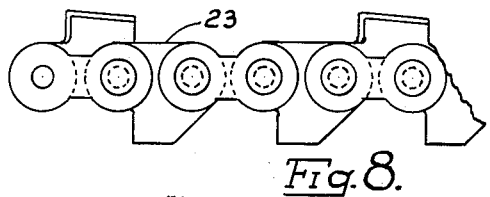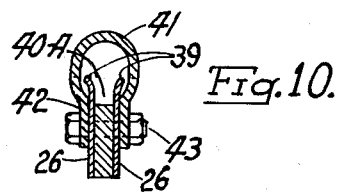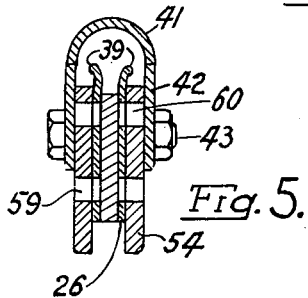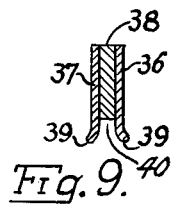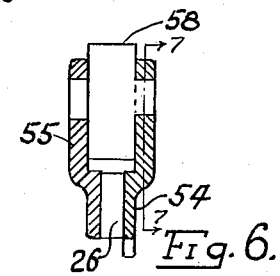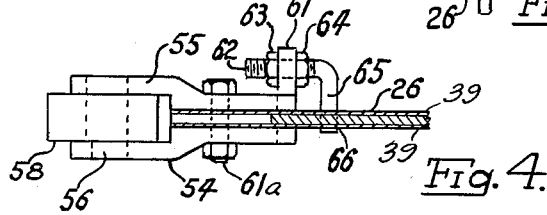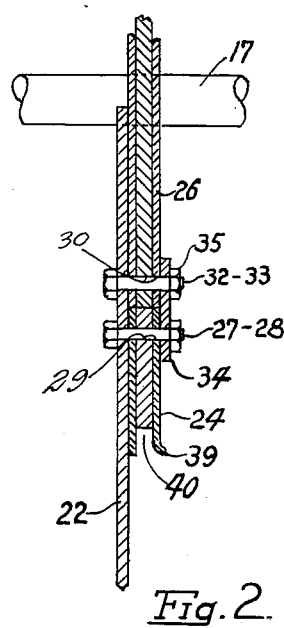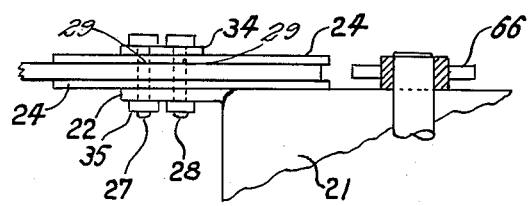

2,731,048
Patented Jan. 17, 1956

2,731,048
BOW TYPE CHAIN SAW CONSTRUCTION

Robert D. Seizert, Lenawee County, Mich., assignor to Clinton Machine Company, Clinton, Mich., a corporation of Michigan Application July 17, 1953, Serial No. 368,620

4 Claims. (Cl. 143—32)

My invention relates to a new and useful improvement in a bow saw construction in which a travelling saw chain is used and power driven to travel around a bow or frame. This type of saw is generally fabricated in a portable form and the driving of the saw chain around the frame or bow is effected by a motor supported on a suitable frame. The bow or frame around which the saw chain travels is provided with a guide groove or channel in which the saw chain travels. Experience has shown that after the saw chain has been used for some time it becomes necessary to adjust some parts of the structure in order to take up the slack in the saw chain which develops from use. Experience has also shown that the use of rollers or some anti-friction member is desirable at the turns in the bow or frame.

In using such a type of saw the bow may be said to consist of an outer rail or bar, a bottom rail or bar and a top rail or bar. In use, the wear on the bottom rail is usually more severe and extensive than the wear on the other rails or parts of the frame. Consequently, it is desirable to form a construction in which the bottom bar or rail may be removed and replaced and it is an object of the present invention to provide a bow construction in which the replacement of the bottom bar or rail may be easily and quickly effected.

In making an adjustment for taking up the slack in the saw chain one of these bars or rails is movable relatively to the other and it is an object of the present invention to provide a movable bar or rail provided with rollers or anti-friction members over which the saw chain may travel.

It is another object of the present invention to provide a movable bar or rail so constructed and so associated with the other bars that upon making the adjustment the path of travel of the saw chain will not be abruptly altered.

Another object of the invention is the provision in a bow construction of a bar pivoted at one end and swingable at the other in order to establish the proper adjustment with the construction so that the swingable end will swing on an arm constituting the continuance of the path of travel of the saw chain prior to passing on to the swingable bar.

Other objects will appear hereinafter.

It is recognized that various modifications and changes may be made in the detail of structure illustrated without departing from the invention and it is intended that the present disclosure shall be considered to be but the preferred embodiment of my invention.

Forming a part of this application are drawings in which,

Fig. 2 is a fragmentary sectional view taken on line 2—2 of Fig. 1;

Fig. 3 is a fragmentary sectional view taken on line 3—3 of Fig. 1;

Fig. 4 is a fragmentary elevational view taken on line 4—4 of Fig. 1 with parts removed;

Fig. 5 is a sectional view taken on line 5—5 of Fig. 1 with parts removed;

Fig. 6 is a fragmentary sectional view taken on line 6—6 of Fig. 1;

Fig. 7 is a fragmentary view taken on line 7—7 of Fig. 6;

Fig. 8 is a side elevational view of a fragment of a saw chain;

Fig. 9 is a sectional view taken on line 9—9 of Fig. 1;

Fig. 10 is a fragmentary sectional view taken on line 10—10 of Fig. 1;

Fig. 11 is a fragmentary side elevational view of a modified form.

Figure 1:
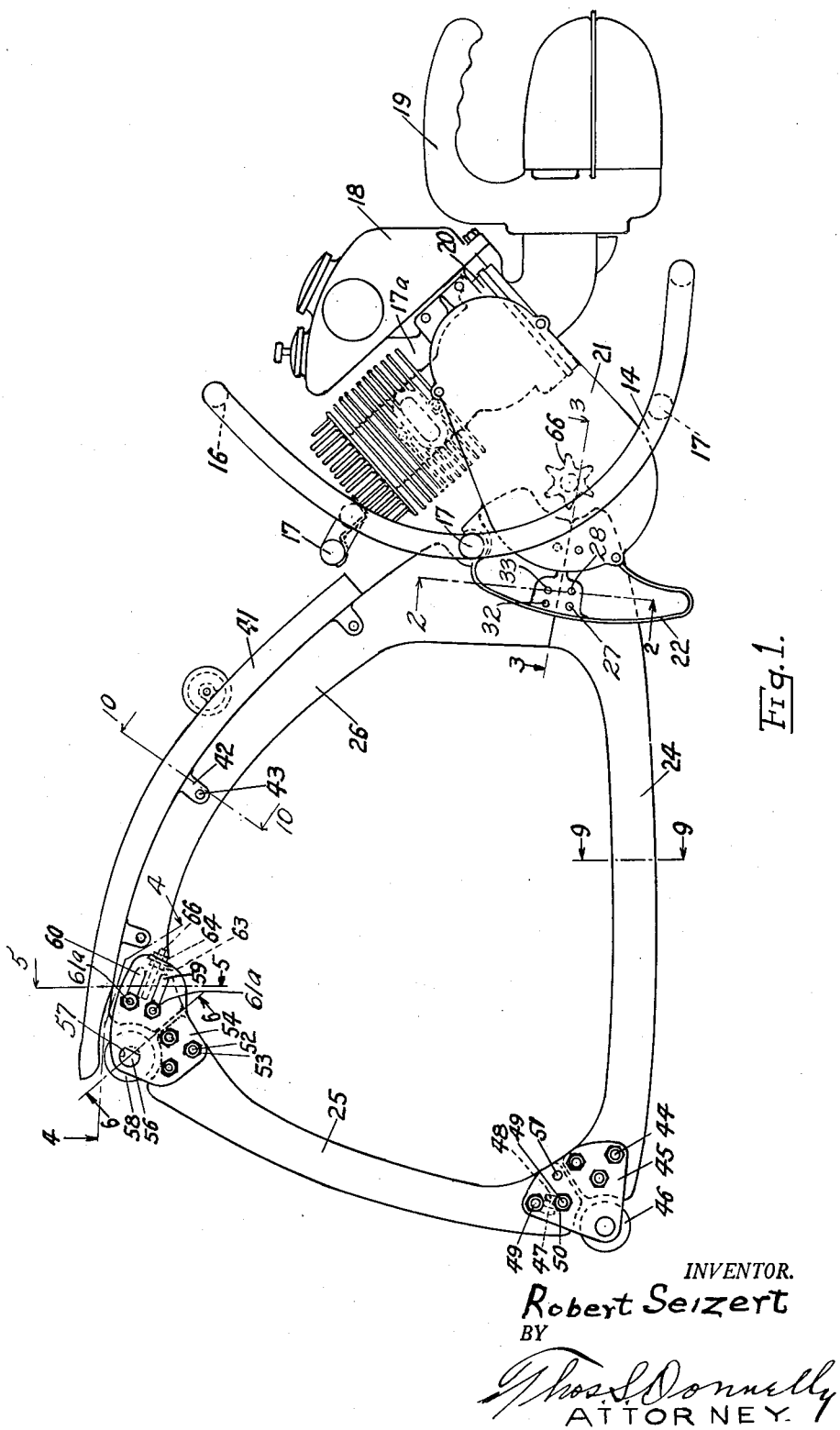
Fig. 1 is a side elevational view of the invention.

As shown in the drawings, a frame embodying the side rails 14 is provided, these side rails being preferably formed integral with the crossbar 16 which serves as a hand-hold. Other crossbars 17 serve to connect the side rails 14. Illustrated as mounted on this frame is an internal combustion engine 17a provided with a gasoline tank 18 and a hand grip 19. The particular construction of the engine and the supporting frame thereof, of itself forms no part of the present invention, and is not detailed.

Mounted on and extending outwardly from the crank case 20 is a supporting plate 21 provided on its forward end with a bumper 22. In use this bumper bears across the periphery of the log or other workpiece which it is desired to saw.

In this construction I have provided a bow around which the saw chain 23 is adapted to travel. This bow consists of the bottom rail or bar 24, the forward rail or bar 25 and the upper rail or bar 26. Projecting outwardly from one side of the supporting plate 21 is a pair of threaded studs 27 and 28 for projecting through the opening 29 formed in the lower rail or bar 24. The upper rail or bar 26 is provided with an opening 30 through which studs 32 and 33 which project outwardly from the supporting plate 21 are adapted to project. A plate 34 is provided with openings for reception of the studs 27, 28, 32 and 33. A nut 35 is threaded on each of these studs so that in this manner the lower bar or rail 24 and the upper bar or rail 26 is fixedly attached to the supporting plate 21. Each of the guide rails 24, 25 and 26 are similarly formed. These guide rails consist of the outer plates 36 and 37 which are spot welded to the inner plate 38, this inner plate 38 being of less width than the plates 37 and 36 which flare outwardly as at 39 so there is thus provided a channel or groove 40 in which the chain 23 may ride. Positioned over the bar or rail 26 is a protective cover 41 provided with the lugs 42 through which securing bolts 43 may be directed, these bolts 43 passing through the plates 36, 37 and 38. As shown in Fig. 1 this protective cover extends at one end beyond the end of the bar or rail 26.

Secured to the free end of the rail 24 by means of the bolts 44 is a plate 45 in which is rotatively mounted a roller 46 which lies at the end of each of the rails 24 and 25 so that the saw chain when travelling from the rail 25 on to the rail 24 will ride over the roller 46. The bar or rail 25 is provided with a pair of arcuate slots 47 and 48 through which extend bolts 49 to secure the rail or bar 25 in fixed position relatively to the plate 45 when the nuts 50 are tightened. A rivet 51 serves to secure the plate 45 pivoted to the bar or rail 25. Upon loosening the nuts 50 this bar or rail 25 may swing on the rivet 51 as a pivot. The plates 45 at opposite sides are substantially duplicates of each other.

Secured to the opposite end of the bar or rail 25 by means of the bolts 52 and the nuts 53 are the plates 54 and 55. Mounted on these plates 54 and 55 is a shaft 56 which projects through openings formed in the plates 54 and 55. One of these openings 57 is provided with a flat face to engage a flat face of the shaft 56 so that the shaft 56 may not rotate. Rotatively mounted on this shaft 56 is a roller 58 over which the saw chain may travel. The plates 54 and 55 overlie opposite sides of one end of the bar or rail 26. Each of these plates 54 and 55 is provided with a pair of elongated slots 59 and 60 through which project the bolts 61a which also extend through the bar or rail 26.

Projecting outwardly from one end of the plate 54 is a lug 61 through which is extended the threaded bolt 62 having the nuts 63 and 64 threaded thereon. This bolt 62 is provided with an angularly turned end 65 extending through the opening 66 formed in the bar or rail 26.

In the view illustrated in Fig. 1 the saw chain would travel counter-clockwise so that as it passed over the roller 58 the protective cover 41 will still overlie the saw chain.

When it is desired to tighten the saw chain so as to adjust any slackness which may have developed through wear, the nuts 50 would be loosened and the nuts on the bolts 61a would also be loosened. Through proper threading of the nuts 63 and 64 the arm 25 might then be swung outwardly toward the left of Fig. 1, Fig. 1 illustrating the bars in their position when swung the maximum distance to the right. In other words, the arm 25 is moved to the position of minimum size and a swinging to the left would of course enlarge the bow and serve to tighten the saw chain. When the proper degree of tension is arrived at the bars may be then held in fixed position upon tightening the various nuts which were loosened.

Approaching the free end of the arm 26 the groove 40A or path of travel of the saw chain on this arm is in the form of an arc preferably struck on the pivot pin 51 as a center.

As the saw chain leaves this groove or path 40A it of course rides over the roller 58 in contact with the periphery thereof. It is desirable that the path of travel of the saw chain usually not be changed in the adjustment made for tensioning the same.

As shown in Fig. 1 the periphery of the roller is tangent to the path of travel of the saw chain. As the arm 25 is swung to the left this tangency is not there as this arm 25 swings on the same pivot which is used as a center to strike the arc which forms the path of travel to the saw chain. In this way there is no variation in the functioning and operation of the saw chain as it travels over the roller regardless of the position of adjustment. In other words, the adjustment does not force the saw chain to travel in a different path for the various adjustments.

In Fig. 11 I have indicated the arm 25 fixedly mounted at its end to the plate 45. However, in this construction the plate 45 is provided with elongated slots 67 through which the bolts 44 project. With this form the adjustment is not made by swinging the arm but the arm may move bodily outwardly.

The sprocket gear 66 illustrated in dotted lines is driven by the engine, and the saw chain 23 travels around this sprocket 66.

What I claim is:

1. In a saw of the class described, an endless saw chain; a frame having a track on its outer surface, said saw chain embracing said frame and travelling around the same in said track, said frame embodying a substantially U-shaped structure having a pair of spaced apart legs, said track adjacent the end of one of said legs being arcuate; a side swingably connected at one end to one of said legs adjacent its end and swingable at its opposite end in substantially the arc of said arcuate portion of said track; and means for securing said side in fixed relation to the ends of said legs in various positions of swingable movement.

2. In a saw of the class described, an endless saw chain; a frame having a track on its outer surface, said saw chain embracing said frame and travelling around the same, said frame embodying a substantially U-shaped structure having a pair of spaced apart legs; a side for said frame pivotally mounted at one of its ends to one of the legs of said U-shaped structure adjacent at end of said leg and swingable at its other end toward and away from the end of said other leg; the track adjacent said end of said other leg being substantially arcuate and struck from the point of pivotal connection of said side of said leg as a center; and means for securing said side in its various positions of swingable movement in fixed relation to said legs.

3. In a saw of the class described, an endless saw chain; a frame having a track on its outer surface, said saw chain embracing said frame and travelling around the same, said frame embodying a substantially U-shaped structure having a pair of spaced apart legs; a side for said frame pivotally mounted at one of its ends to one of the legs of said U-shaped structure adjacent at end of said leg and swingable at its other end toward and away from the end of said other leg; the track adjacent said end of said other leg being substantially arcuate and struck from the point of pivotal connection of said side of said leg as a center; and means for securing said side in its various positions of swingable movement in fixed relation to said legs, and a roller carried on the free end of said swingable leg and engaged at its periphery with said saw chain.

4. In a saw of the class described, an endless saw chain; a frame having a track on its outer surface, said saw chain embracing said frame and travelling around the same, said frame embodying a substantially U-shaped structure having a pair of spaced apart legs; a side for said frame pivotally mounted at one of its ends to one of the legs of said U-shaped structure adjacent at end of said leg and swingable at its other end toward and away from the end of said other leg, the track adjacent said end of said other leg being substantially arcuate and struck from the point of pivotal connection of said side of said leg as a center; and means for securing said side in its various positions of swingable movement in fixed relationship to said legs and a roller carried on the free end of said swingable leg and engaged at its periphery with said saw chain, the periphery of said roller lying in the arc established by the arcuate portion of said track.

References Cited in the file of this patent

UNITED STATES PATENTS

| Re. 15,294 | Lofgren | Feb. 28, 1922 |
| 1,195,945 | Mitchell et al. | Aug. 22, 1916 |
| 1,233,494 | Morgan | July 17, 1917 |
| 1,539,818 | Arsneau | June 2, 1925 |
| 1,601,201 | Daw | Sept. 28, 1926 |
| 2,525,110 | Adair | Oct. 10, 1950 |